(12) United States Patent
Jäntti

(10) Patent No.: US 6,317,610 B1
(45) Date of Patent: Nov. 13, 2001

(54) METHOD OF COMBINING SEVERAL SIGNALS, AND BASE STATION

(75) Inventor: Arto Jäntti, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,218

(22) PCT Filed: Oct. 28, 1997

(86) PCT No.: PCT/FI97/00658

§ 371 Date: Mar. 23, 1999

§ 102(e) Date: Mar. 23, 1999

(87) PCT Pub. No.: WO98/19465

PCT Pub. Date: May 7, 1998

(30) Foreign Application Priority Data

Oct. 29, 1996 (FI) .......................................... 964362

(51) Int. Cl.[7] .................................................. H04B 1/04
(52) U.S. Cl. ........................ 455/561; 455/127; 455/103
(58) Field of Search .................................. 455/102, 103, 455/127, 561, 562; 375/132

(56) References Cited

U.S. PATENT DOCUMENTS

| 4,941,200 | 7/1990 | Leslie et al. . |
| 5,163,181 | * 11/1992 | Koontz ................................ 455/103 |
| 5,214,787 | 5/1993 | Karkota et al. . |
| 5,559,788 | 9/1996 | Zscheile, Jr. et al. . |

FOREIGN PATENT DOCUMENTS

| 502811 | 1/1996 | (DE) . |
| 0622910 | 11/1994 | (EP) . |
| 0681374 | 11/1995 | (EP) . |
| 60-150344 | * 8/1985 | (JP) ..................................... 455/103 |
| WO 96/13917 | 5/1996 | (WO) . |

OTHER PUBLICATIONS

J. Carter, "Communications repeaters", Chapter 14, Satellite Communication SystemS, 1987, pp. 230–250.

Extend–A–Cell IV Technical Manual, vol. 3, 1993, Technical Information, pp. 1–1 –3–11.

\* cited by examiner

Primary Examiner—Nguyen T. Vo
(74) Attorney, Agent, or Firm—Pillsbury Winthrop LLP

(57) ABSTRACT

A method of combining signals to a base station and combining signals in a radio network. The base station including an antenna, a modulating mechanism for generating and modulating carrier waves, and transmitters for generating signals that are modulated by the generated carrier waves. The signals are transmitted using an antenna. The modulating mechanism modulates two or more signals per generated carrier wave. The base station includes an amplification mechanism for amplifying the signals modulated by the carrier waves, and a mechanism configured to passively combine the signals modulated by the carrier waves to the same antenna after amplification.

9 Claims, 1 Drawing Sheet

METHOD OF COMBINING SEVERAL SIGNALS, AND BASE STATION

BACKGROUND OF THE INVENTION

1. Field of the Invention

The invention relates to a method of combining several signals, the method being used at base stations of a radio network, carrier waves and signals being generated at the base station, the signals being used for modulating the generated carrier waves, the base station comprising an antenna for transmitting the modulated signals to a carrier wave.

The invention further relates to a base station used for combining several signals in a radio network, the base station comprising an antenna, modulating means for generating and modulating carrier waves, and transmitters for generating signals for modulating the generated carrier waves, the signals being transmitted modulated to a carrier wave using the antenna.

2. Description of the Related Art

In cellular radio systems, such as GSM/DCS systems, the base station antenna transmits several signals generated by base station transmitters. The signals modulate the carrier wave and the carrier waves are transmitted to the radio path using a radio channel. There are various methods of transmitting signals generated by transmitters to the radio path using only one antenna. It is common to use different combiners for combining several transmitters with the same antenna at the base station.

Very often a transmitting and a receiving antenna do not have a clear line of sight; instead, there are obstacles in the line of sight caused by terrain or buildings. Thus the signal perceived in the receiver is the sum of signals propagated on several routes reflected off the obstacles, and are of different phases. The sum of several signals of different phases follows the Rayleigh distribution, when the phases are randomly distributed. The fading of the signal also depends on the frequency of the signal. The frequency selective fading of a signal is one of the reasons why the frequency hopping technique is used in digital cellular radio networks. Frequency hopping means that the transmission frequency used o n a connection is changed at regular intervals. Due to frequency hopping, the transfer quality of a signal can be improved, especially in cases in which a subscriber terminal moves very slowly or is stationary, which is often the case when e.g. a mobile phone is used. In addition to the frequency diversity brought about by frequency hopping, the technique is useful in scattering the interference caused by a radio connection over several frequencies such that the momentary interference at a particular frequency remains small.

In order to achieve an advantage from frequency hopping in the digital GSM and DCS systems, more than four frequencies should be used. Currently narrowband transmitter combiners are commonly used at base stations. The narrowband combiners, whose function is to combine several transmitters with one antenna, restrict the number of frequencies used in frequency hopping to the number of actual transceiver units and combiner filters. Thus for example, a base station using three transceiver units and three combiner filters enables the use of three frequencies in frequency hopping.

Narrowband transmitter combiners are large and complex components because they have to able to be tuned. Wideband combiners have also been developed that do not require tuning such as a narrowband transmitter. Wideband combiners, together with frequency hopping synthesizers, do not restrict the number of frequencies used. A problem with wideband combiners is, however, that combiner attenuations become extremely large compared with narrowband combiners, when more than two transmitters are combined with the same wideband combiner. Hence, it has not been possible to use wideband combiners at base stations, from which a large traffic capacity is required, but narrowband combiners have had to be used. The implementation of frequency hopping at these base stations has thus been inadequate.

Alternatively, it has also been possible to combine the modulated carrier waves before the final amplification of the signal. A linear amplifier in particular has been used as the amplifier. A disadvantage of the linear amplifier has, however, been its difficult technical implementation, as the linearity requirements of the amplifier have been high. Furthermore, the performance of linear amplifiers has been poor.

BRIEF SUMMARY OF THE INVENTION

A method and apparatus are provided to allow several transmitters to be combined into the same antenna in such a manner as to permit easy implementation of frequency hopping. Further the present invention provides for the implementation of a base station, in which an amplifier that is easy to implement is used to amplify the carrier wave.

The method comprises two or more signals that are modulated to their own carrier wave, and then the carrier waves modulated by the signals are amplified. The carrier waves modulated by the signals are passively combined after amplification to the same antenna.

The base station of the present invention comprises the means for amplifying the carrier waves modulated by the signals, and means for passively combining the carrier waves modulated by the signals after amplification to the same antenna wherein the modulating means modulate two or more signals to their own carrier waves.

An advantage achieved with the method of the present invention is that the carrier wave is modulated by two different signals and several carrier waves are combined in such a manner that the carrier waves can be transmitted using one antenna. The method preferably uses a DDS modulating method, in which, e.g. two modulating signals can be easily implemented. Furthermore, the carrier waves are amplified with an amplifier, whose linearity requirements are easy to implement. In addition, the carrier waves are combined to one antenna in wideband to enable the use of frequency hopping.

The preferred embodiments of the method of the invention are also disclosed in the enclosed dependent claims and the preferred embodiments of the base station of the invention are disclosed in the enclosed dependent claims.

BRIEF DESCRIPTION OF THE DRAWINGS

In the following the invention will be described in greater detail with reference to examples in the accompanying drawings, in which.

DETAILED DESCRIPTION OF THE PREFERRED EMBODIMENTS

Figure 1:
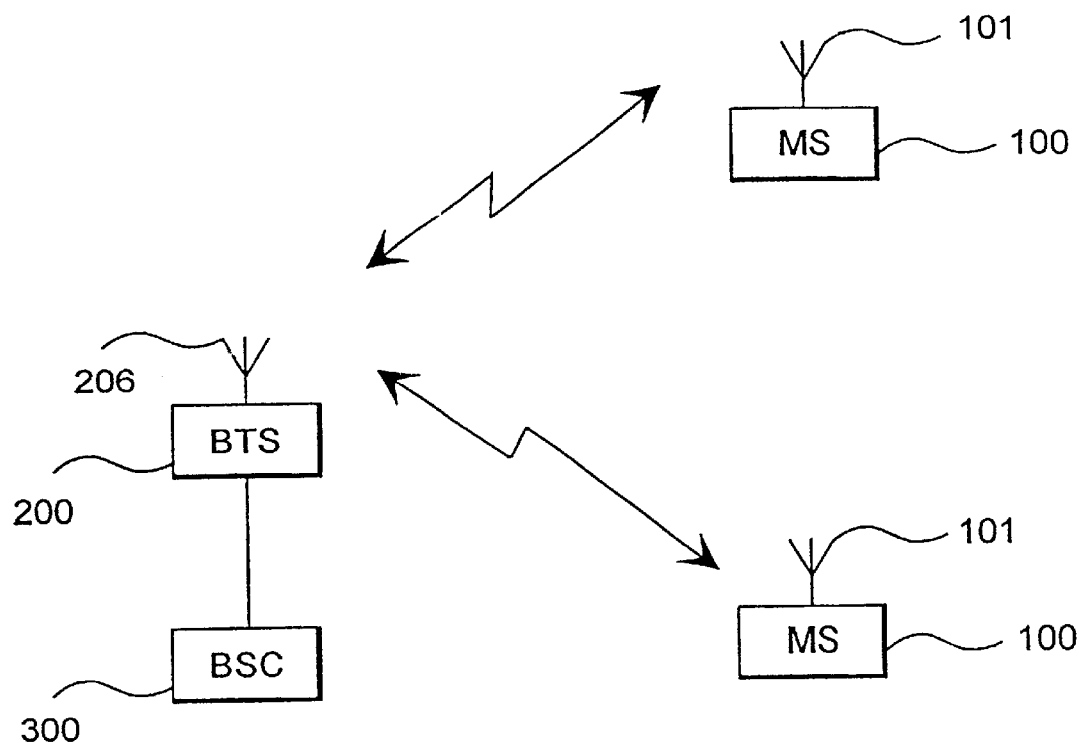
FIG. 1 shows a cellular radio system, in which the base station of the invention can be used.

FIG. 1 shows a cellular radio system, in which the solution of the invention can be used. The cellular radio system comprises in each cell at least one base station 200 and a number of subscriber terminals 100. The subscriber terminals 100 comprise an antenna 101 and the base station comprises an antenna 206 for transmitting and to receiving signals. The base station 200 communicates with the subscriber terminals 100 within its area. There is also a connection from the base station 200 to a base station controller 300, which controls the operation of the base station 200 and connects the calls of the subscriber terminals 100 further to a fixed network or to other parts of the system. The connection between the base station 200 and the base station controller 300 is implemented e.g. using a PCM technique. In FIG. 1 the base station 200 and the subscriber terminal 100 operate as transceivers. The base station 200 of the invention can preferably be used in e.g. digital GSM and DCS cellular radio systems, in which frequency hopping technique is used.

In the cellular radio system, shown in FIG. 1, the base station 200 and the subscriber terminals 100 transmit signals to one another using a carrier wave. A transmitted signal is used for establishing a connection between the base station 200 and the subscriber terminal 100. The transmitted signal comprises information. The signal is modulated before transmission. In modulation, a carrier wave is modulated with e.g. a digital signal. In reception, the carrier wave is demodulated, whereby a signal comprising information is separated from the carrier wave.

Figure 2:
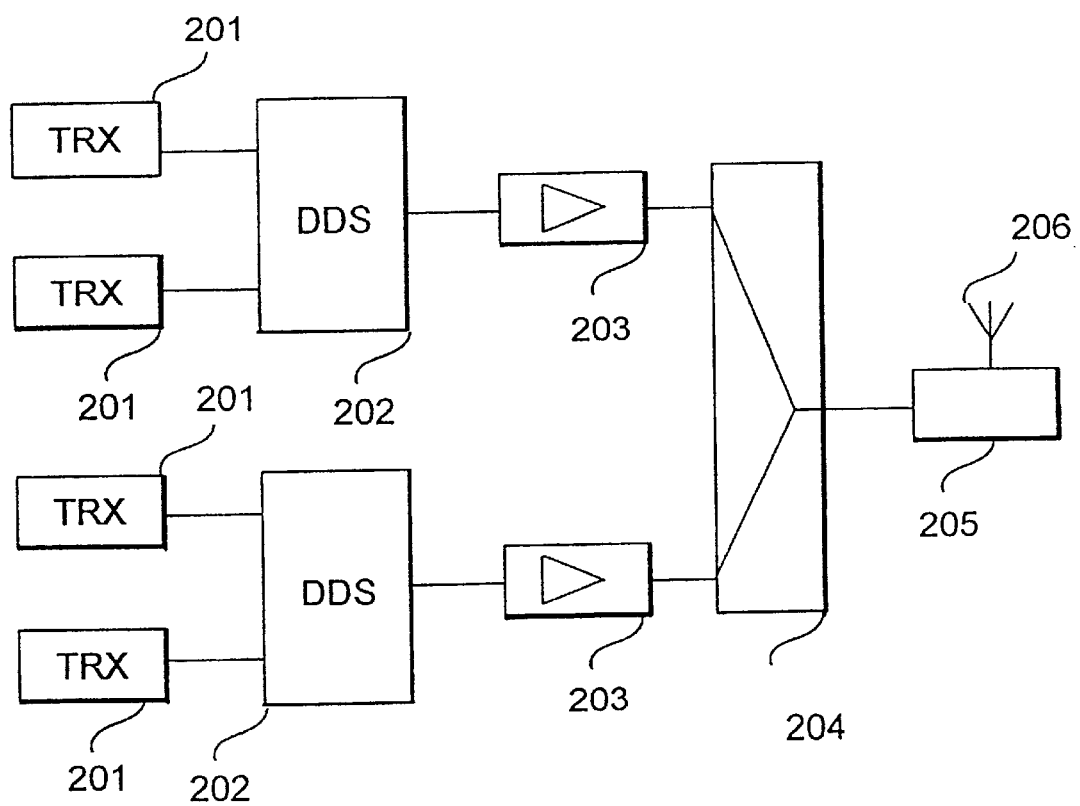
FIG. 2 shows a block diagram illustrating the structure of the base station of the invention.

In FIG. 2 a block diagram illustrates the structure of the base station 200 in accordance with tone preferred embodiment of the invention. The base station 200 of the invention comprises a number of transmitters 201, modulating means 202 and an antenna 206. In the solution shown in FIG. 2, the transmitters 201 are coupled to the modulating means 202. The modulating means 202 generate and modulate a carrier wave signal. The base station 200 transmits a signal modulated by the carrier wave to the subscriber terminals 100. The base station 200 further comprises means 203 for amplifying the signal and means 204 for combining the transmitters 201 with the antenna 206. Furthermore, the base station 200 comprises an antenna filter 205 connected between the means 204 and the antenna 206. The antenna filter 205 functions as a duplex filter which is needed when the same physical antenna is used as a transmitting and a receiving antenna.

In FIG. 2, there are preferably two transmitters 201 coupled to the same modulating means 202. The transmitters 201 transmit signals to the modulating means 202. The signals are modulated by a carrier wave that is generated in the modulating means 202. When modulating the carrier wave, the modulating means 202 preferably uses the DDS (Direct Digital Synthesis) method in which it is possible to easily implement various modulation methods. In the DDS method, an output frequency is digitally generated from a reference frequency. The DDS method is very well adapted for use especially in cellular radio systems using frequency hopping and the spread-spectrum technique. Thus, in FIG. 2, the modulating means 202 modulates the carrier wave using a signal generated by two transmitters 201. The modulating means 202 preferably modulates two or more signals per generated carrier wave.

After modulation, the carrier wave is connected to the means 203 that functions as an amplifier. The means 203 amplify the carrier wave in such a manner that the carrier wave propagates far enough from the base station 200 to the subscriber terminals 100. The means 203 have preferably been implemented as half linear, whereby the linearity requirements of the means 203 are held within reasonable limits compared with e.g. the linearity requirements of a linear amplifier. In addition, it is fairly easy to implement a half linear amplifier, and a good performance is obtained for said amplifier. After amplification, the carrier wave is connected through the antenna filter 205 and the antenna 206. The carrier wave is then transmitted to the subscriber terminals 100 within the coverage area of the base station 200.

If the base station 200 comprises more than two transmitters 201, more carrier waves are generated at the base station 200. Such a number of carrier waves are generated such that each carrier wave preferably comprises a signal generated by two transmitters 201. Several generated carrier waves are combined in the means 204, whereby the signals generated by several transmitters 201 are connected to the same antenna 206. The means 204 passively combine the signals modulated by the carrier waves using one antenna 206. The means 204 are preferably implemented using a wideband combiner. The combiner enables the use of frequency hopping in a cellular radio network.

At the base station 200 of the invention several transmitters 201 are connected to one antenna 206. The transmitter 201 generates a signal that modulates the carrier wave. Preferably the carrier wave is modulated by two different signals. The modulated carrier wave is amplified, and if several carrier waves are generated, the carrier waves are combined in e.g. a hybrid combiner 204. The combiner 204 is arranged to combine several carrier waves for transmission to the radio path through one antenna 206.

Even though the invention has been explained in the above with reference to the example in accordance with the accompanying drawings, it is obvious that the invention is not restricted to it but can be modified in various ways within the scope of the inventive idea disclosed in the attached claims.

What is claimed is:

1. A method of combining a plurality of signals at a base station of a radio network in which signals generated at the base station are modulated by generated carrier waves, the base station comprising an antenna for transmitting the modulated signals to the carrier wave, wherein two or more signals are modulated per generated carrier wave by the same modulating mechanism, and then the carrier waves modulated by the signals are amplified with a set of multicarrier amplifiers, each multicarrier amplifier amplifying at least two of the modulated signals, output signals of the multicarrier amplifiers are passively combined to the same antenna.

2. The method as claimed in claim 1, wherein the carrier waves are combined to the same antenna in wideband.

3. The method as claimed in claim 1, wherein said method is used in GSM/DCS radio networks using frequency hopping.

4. The method as claimed in claim 1, wherein a Direct Digital Synthesis (DDS) method or a method corresponding to the DDS method is used in the modulation.

5. A base station for combining a plurality of signals in a radio network, the base station comprising an antenna, a modulating mechanism configured to generate and modulate carrier waves, and transmitters for generating signals that are modulated by the generated carrier waves, the signals being transmitted to the carrier wave by said antenna wherein the modulating mechanism modulates two or more signals per generated carrier wave, and that the base station comprises multicarrier amplification mechanism for amplifying the signals modulated by the carrier waves, and a combining mechanism configured to passively combine the amplified signals modulated by the carrier waves to the same antenna.

6. The base station as claimed in claim 5, wherein the carrier waves are combined to the same antenna in wideband.

7. The base station as claimed in claim 5, the modulating mechanism uses a DDS method or a method corresponding to the DDS method to modulate the carrier wave.

8. The base station as claimed in claim 5, wherein the multi-carrier amplification mechanism is half linear.

9. The base station as claimed in claim 5, wherein the base station is used in GSM/DCS radio networks using frequency hopping.

* * * * *